(12) United States Patent
Freitag et al.

(10) Patent No.: US 11,657,836 B2
(45) Date of Patent: May 23, 2023

(54) MAGNETIC RECORDING DEVICES HAVING NEGATIVE POLARIZATION LAYER TO ENHANCE SPIN-TRANSFER TORQUE

(71) Applicant: Western Digital Technologies, Inc., San Jose, CA (US)

(72) Inventors: James Mac Freitag, Sunnyvale, CA (US); Susumu Okamura, San Jose, CA (US); Alexander Goncharov, Morgan Hill, CA (US); Zheng Gao, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/649,246

(22) Filed: Jan. 28, 2022

(65) Prior Publication Data

US 2022/0148619 A1    May 12, 2022

Related U.S. Application Data

(63) Continuation of application No. 16/912,509, filed on Jun. 25, 2020, now Pat. No. 11,257,514.

(51) Int. Cl.
*G11B 5/127* (2006.01)
*G11B 5/02* (2006.01)
(Continued)

(52) U.S. Cl.
CPC .............. *G11B 5/1278* (2013.01); *G11B 5/02* (2013.01); *G11B 5/23* (2013.01); *G11B 5/313* (2013.01);
(Continued)

(58) Field of Classification Search
None
See application file for complete search history.

(56) References Cited

U.S. PATENT DOCUMENTS

| 8,274,811 B2 | 9/2012 | Zhang et al. |
| 8,472,135 B1 | 6/2013 | Kusukawa et al. |

(Continued)

FOREIGN PATENT DOCUMENTS

| WO | 2015126326 A1 | 8/2015 |
| WO | 2016076799 A1 | 5/2016 |

OTHER PUBLICATIONS

Yoshida et al. "Spin Torque Oscillator With Negative Magnetic Anisotropy Materials for MAMR," IEEE Transactions on Magnetics, vol. 46, No. 6, Jul. 2010, pp. 2466-2469.

(Continued)

*Primary Examiner* — William J Klimowicz
(74) *Attorney, Agent, or Firm* — Patterson + Sheridan, LLP; Steven H. VerSteeg

(57) ABSTRACT

Aspects of the present disclosure generally relate to a magnetic recording head of a spintronic device, such as a write head of a data storage device, for example a magnetic media drive. In one example, a magnetic recording head includes a main pole, a trailing shield, and a spin torque layer (STL) between the main pole and the trailing shield. The magnetic recording head includes a first layer structure on the main pole, and the first layer structure includes a negative polarization layer. The magnetic recording head also includes a second layer structure disposed on the negative polarization layer and between the negative polarization layer and the STL. The negative polarization layer is an FeCr layer. The second layer structure includes a Cr layer disposed on the FeCr layer, and a Cu layer disposed on the Cr layer and between the Cr layer and the STL.

20 Claims, 7 Drawing Sheets

(51) Int. Cl.
*G11B 5/31* (2006.01)
*G11B 5/23* (2006.01)

(52) U.S. Cl.
CPC .............. *G11B 5/314* (2013.01); *G11B 5/315* (2013.01); *G11B 5/3133* (2013.01); *G11B 5/3146* (2013.01)

(56) References Cited

U.S. PATENT DOCUMENTS

| | | | |
|---|---|---|---|
| 8,953,283 B2 | 2/2015 | Shimizu et al. | |
| 9,099,107 B1 | 8/2015 | Igarashi et al. | |
| 9,218,828 B1 | 12/2015 | Koui et al. | |
| 9,406,315 B2 | 8/2016 | Shiimoto et al. | |
| 10,037,772 B2 | 7/2018 | Okamura et al. | |
| 10,410,658 B1 | 9/2019 | Liu et al. | |
| 10,891,975 B1 | 1/2021 | Bai et al. | |
| 10,991,390 B2 | 4/2021 | Kobayashi | |
| 2012/0113540 A1 | 5/2012 | Zhang et al. | |
| 2013/0271866 A1 | 10/2013 | Sato | |
| 2014/0146420 A1 | 5/2014 | Shimizu et al. | |
| 2015/0103431 A1* | 4/2015 | Igarashi | G11B 5/3146 360/59 |
| 2015/0124347 A1 | 5/2015 | Shimoto et al. | |
| 2015/0228295 A1* | 8/2015 | Shiimoto | G11B 5/235 360/125.31 |
| 2016/0086623 A1 | 3/2016 | Nagasaka et al. | |
| 2016/0118065 A1 | 4/2016 | Chen et al. | |
| 2016/0180867 A1 | 6/2016 | Takagishi et al. | |
| 2017/0301855 A1 | 10/2017 | Zhang et al. | |
| 2017/0309301 A1 | 10/2017 | Takahashi et al. | |
| 2019/0279666 A1* | 9/2019 | Freitag | G11B 5/6082 |
| 2020/0312354 A1 | 10/2020 | Wu et al. | |
| 2021/0056987 A1 | 2/2021 | Wu | |
| 2021/0074318 A1 | 3/2021 | Wu | |

OTHER PUBLICATIONS

Tagawa "Effect of Transmitted Spin from Head Poles in MAMR," Journal of the Magnetics Society of Japan, vol. 44, No. 1, 2020, pp. 5-8, https://www.jstage.jst.go.jp/article/msjmag/44/1/44_2001R001/_pdf. Last accessed Oct. 19, 2020.

Watanabe et al. "Oscillation Stability of a Small Size Spin Torque Oscillator for MAMR," IEEE Transactions on Magnetics, vol. 49, No. 7, Jul. 15, 2013, pp. 3628-3631, https://ieeexplore.ieee.org/document/6558956. Last accessed Oct. 19, 2020.

* cited by examiner

MAGNETIC RECORDING DEVICES HAVING NEGATIVE POLARIZATION LAYER TO ENHANCE SPIN-TRANSFER TORQUE

CROSS-REFERENCE TO RELATED APPLICATIONS

This application is a continuation of co-pending U.S. patent application Ser. No. 16/912,509, filed Jun. 25, 2020, which is herein incorporated by reference.

BACKGROUND OF THE DISCLOSURE

Field of the Disclosure

Aspects of the present disclosure generally relate to a magnetic recording head of a spintronic device, such as a write head of a data storage device, for example a magnetic media drive.

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer.

In order to achieve higher recording densities, such as recording densities exceeding 2 Tbit/in$^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic write head at a media facing surface. As the main pole becomes smaller, the writing field becomes smaller as well, limiting the effectiveness of the magnetic write head.

Heat-assisted magnetic recording (HAMR) and microwave-assisted magnetic recording (MAMR) are two types of energy-assisted recording technology to improve the recording density of a magnetic recording medium, such as a HDD. In MAMR, a spin torque oscillator (STO) device is located next to or near the write element in order to produce a high-frequency AC field, such as in a microwave frequency band. The high-frequency AC field reduces an effective coercivity of a magnetic recording medium used to store data and allows writing of the magnetic recording medium at lower magnetic writing fields emanated from the write pole. Thus, higher recording density of the magnetic recording medium may be achieved by MAMR technology.

Energy-assisted recording write heads may require an undesirable high voltage and/or an undesirable high current to produce a write field enhancement. A high voltage and/or high current may impact the lifetime and the reliability of the write head by degrading components of the write head. Lowering the voltage, moment-thickness product of the energy-assist magnetic layer, or the current can hinder writer performance, lower areal density capability (ADC), and/or limit the materials used in write heads.

Therefore, there is a need for write heads that simply and effectively facilitate write head performance reliability and high moment-thickness product of the energy-assist magnetic layer while facilitating lower voltage or current to facilitate effective and efficient magnetic recording, and high ADC of magnetic recording.

SUMMARY OF THE DISCLOSURE

Aspects of the present disclosure generally relate to a magnetic recording head of a spintronic device, such as a write head of a data storage device, for example a magnetic media drive. In one example, a magnetic recording head includes a main pole, a trailing shield, and a spin torque layer (STL) between the main pole and the trailing shield that provides energy-assisted write field enhancement. The magnetic recording head includes a first layer structure on the main pole, and the first layer structure includes a negative polarization layer. The magnetic recording head also includes a second layer structure disposed on the negative polarization layer and between the negative polarization layer and the STL. The negative polarization layer is an FeCr layer. The second layer structure includes a Cr layer disposed on the FeCr layer, and a Cu layer disposed on the Cr layer and between the Cr layer and the STL.

In one implementation, a magnetic recording head includes a main pole, a trailing shield, a spin torque layer (STL) between the main pole and the trailing shield, and a first spacer layer between the STL and the trailing shield. The magnetic recording head also includes a multilayer structure disposed on the main pole and between the main pole and the STL. The multilayer structure includes a first layer structure on the main pole. The first layer structure includes a negative polarization layer. The multilayer structure also includes a second layer structure disposed on the negative polarization layer and between the negative polarization layer and the STL.

In one implementation, a magnetic recording head includes a main pole, a trailing shield, a spin torque layer (STL) between the main pole and the trailing shield, and a multilayer structure disposed on the main pole and between the main pole and the STL. The multilayer structure includes an FeCr layer between the main pole and the STL, a Cr layer disposed on the FeCr layer, and a Cu layer disposed on the Cr layer and between the Cr layer and the STL.

In one implementation, a magnetic recording head includes a main pole, a trailing shield, a spin torque layer (STL) between the main pole and the trailing shield, and at least one negative polarization layer between the main pole and the STL. The at least one negative polarization layer includes a magnetic material.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure generally relate to a magnetic recording head of a spintronic device, such as a write head of a data storage device, for example a magnetic media drive. In one example, a magnetic recording head includes a main pole, a trailing shield, and a spin torque layer (STL) between the main pole and the trailing shield. The magnetic recording head includes a first layer structure on the main pole, and the first layer structure includes a negative polarization layer. The magnetic recording head also includes a second layer structure disposed on the negative polarization layer and between the negative polarization layer and the STL. The negative polarization layer is an FeCr layer. The second layer structure includes a Cr layer disposed on the FeCr layer, and a Cu layer disposed on the Cr layer and between the Cr layer and the STL.

Figure 1:
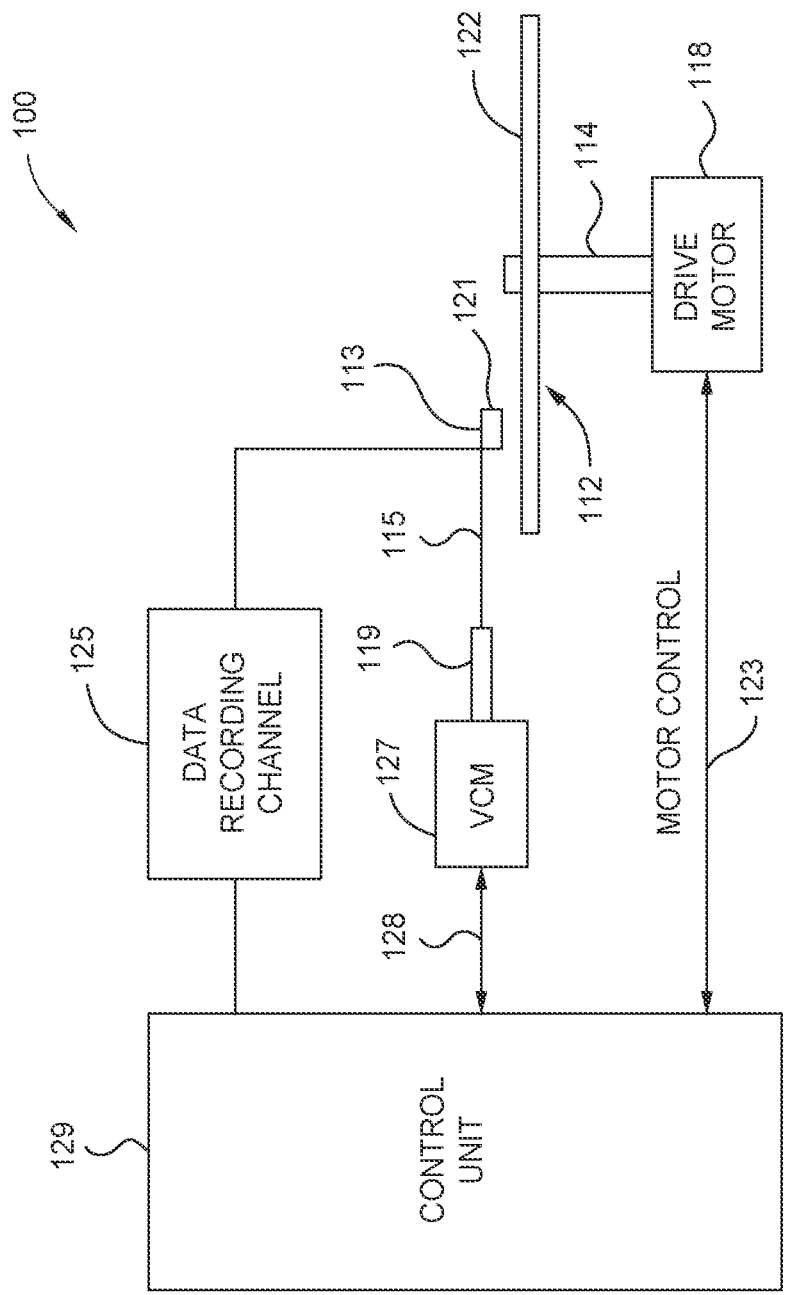
FIG. 1 is a schematic illustration of a magnetic recording device, according to one implementation.

FIG. 1 is a schematic illustration of a magnetic recording device 100, according to one implementation. The magnetic recording device 100 includes a magnetic recording head, such as a write head. The magnetic recording device 100 is a magnetic media drive, such as a hard disk drive (HDD). Such magnetic media drives may be a single drive/device or include multiple drives/devices. For the ease of illustration, a single disk drive is shown as the magnetic recording device 100 in the implementation illustrated in FIG. 1. The magnet recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads (such as read/write heads), such as a write head including a spintronic device. As the rotatable magnetic disk 112 rotates, the slider 113 moves radially in and out over the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by a control unit 129.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

Figure 2:
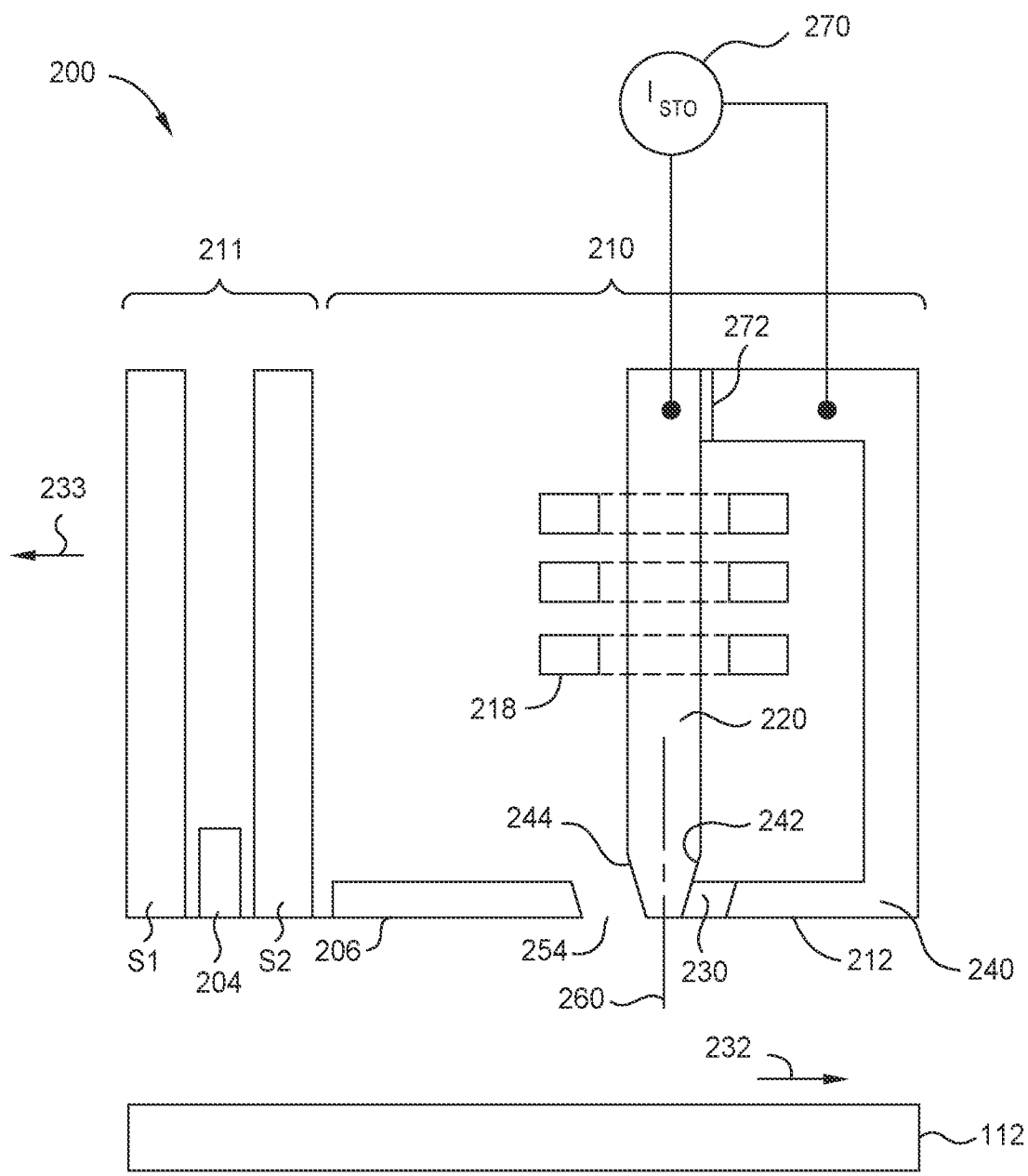
FIG. 2 is a schematic illustration of a cross sectional side view of a head assembly facing the magnetic disk shown in FIG. 1 or other magnetic storage medium, according to one implementation.

FIG. 2 is a schematic illustration of a cross sectional side view of a head assembly 200 facing the rotatable magnetic disk 112 shown in FIG. 1 or other magnetic storage medium, according to one implementation. The head assembly 200 may correspond to the head assembly 121 described in FIG. 1. The head assembly 200 includes a media facing surface (MFS) 212, such as an air bearing surface (ABS), facing the rotatable magnetic disk 112. As shown in FIG. 2, the rotatable magnetic disk 112 relatively moves in the direction indicated by the arrow 232 and the head assembly 200 relatively moves in the direction indicated by the arrow 233.

In one embodiment, which can be combined with other embodiments, the head assembly 200 includes a magnetic read head 211. The magnetic read head 211 may include a sensing element 204 disposed between shields S1 and S2. The sensing element 204 is a magnetoresistive (MR) sensing element, such an element exerting a tunneling magnetoresistive (TMR) effect, a magneto-resistance (GMR) effect, an extraordinary magneto-Resistive (EMR) effect, or a spin torque oscillator (STO) effect. The magnetic fields of magnetized regions in the rotatable magnetic disk 112, such as perpendicular recorded bits or longitudinal recorded bits, are detectable by the sensing element 204 as the recorded bits.

The head assembly 200 includes a write head 210. In one embodiment, which can be combined with other embodiments, the write head 210 includes a main pole 220, a leading shield 206, a trailing shield (TS) 240, and a spintronic device 230 disposed between the main pole 220 and the TS 240. The main pole 220 serves as a first electrode. Each of the main pole 220, the spintronic device 230, the leading shield 206, and the trailing shield (TS) 240 has a front portion at the MFS.

The main pole 220 includes a magnetic material, such as CoFe, CoFeNi, or FeNi, other suitable magnetic materials. In one embodiment, which can be combined with other embodiments, the main pole 220 includes small grains of magnetic materials in a random texture, such as body-centered cubic (BCC) materials formed in a random texture. In one example, a random texture of the main pole 220 is formed by electrodeposition. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures.

In one embodiment, which can be combined with other embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In one embodiment, which can be combined with other embodiments, the main pole 220 does not include the trailing taper 242 and the leading taper 244. In such an embodiment, the main pole 220 includes a trailing side and a leading side in which the trailing side and the leading side are substantially parallel.

The TS 240 includes a magnetic material, such as FeNi, or other suitable magnetic materials, serving as a second electrode and return pole for the main pole 220. The leading shield 206 may provide electromagnetic shielding and is separated from the main pole 220 by a leading gap 254.

The spintronic device 230 is positioned proximate the main pole 220 and reduces the coercive force of the magnetic recording medium, so that smaller writing fields can be used to record data. An electron current is applied to spintronic device 230 from a current source 270 to produce a microwave field. The electron current may include direct current (DC) waveforms, pulsed DC waveforms, and/or pulsed current waveforms going to positive and negative voltages, or other suitable waveforms.

In one embodiment, which can be combined with other embodiments, the spintronic device 230 is electrically coupled to the main pole 220 and the TS 240. The main pole 220 and the TS 240 are separated in an area by an insulating layer 272. The current source 270 may provide electron current to the spintronic device 230 through the main pole 220 and the TS 240. For direct current or pulsed current, the current source 270 may flow electron current from the main pole 220 through the spintronic device 230 to the TS 240 or may flow electron current from the TS 240 through the spintronic device 230 to the main pole 220 depending on the orientation of the spintronic device 230. In one embodiment, which can be combined with other embodiments, the spintronic device 230 is coupled to electrical leads providing an electron current other than from the main pole 220 and/or the TS 240.

Figure 3A:
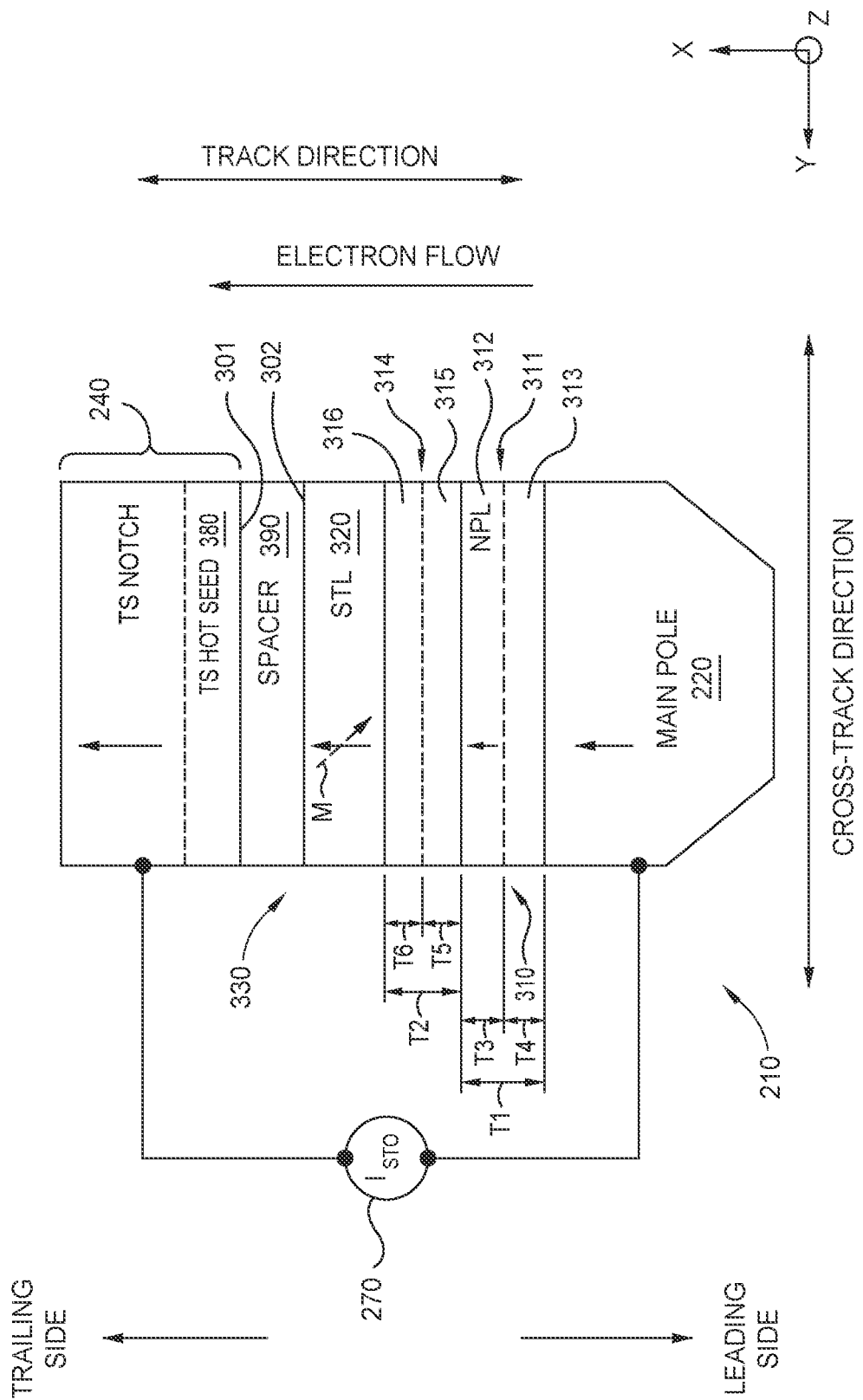
FIG. 3A is a schematic illustration of a plan view of an MFS of the write head shown in FIG. 2, according to one implementation.

FIG. 3A is a schematic illustration of a plan view of an MFS of the write head 210 shown in FIG. 2, according to one implementation. The write head 210 includes a spintronic device 330 between the main pole 220 and the TS 240 in the track direction. The spintronic device 330 may be used as the spintronic device 230 shown in FIG. 2.

It is to be understood that the magnetic recording head discussed herein is applicable to a data storage device such as a hard disk drive (HDD) as well as a tape drive such as a tape embedded drive (TED) or an insertable tape media drive. An example TED is described in co-pending patent application titled "Tape Embedded Drive," U.S. application Ser. No. 16/365,034, filed Mar. 31, 2019, assigned to the same assignee of this application, which is herein incorporated by reference. As such, any reference in the detailed description to a HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

It is also to be understood that aspects disclosed herein, such as the magnetic recording heads, may be used in magnetic sensor applications outside of HDD's and tape media drives such as TED's, such as spintronic devices other than HDD's and tape media drives. As an example, aspects disclosed herein may be used in magnetic elements in magnetoresistive random-access memory (MRAM) devices (e.g., magnetic tunnel junctions as part of memory elements), magnetic sensors or other spintronic devices.

The spintronic device 330 uses spin-transfer torque (STT) to facilitate magnetic recording. The present disclosure contemplates that the spintronic device 330 may be used with spin-orbital torque (SOT).

The spintronic device 330 includes a multilayer structure 310 disposed on the main pole 220, a spin torque layer 320 (STL), and a first spacer layer 390. In one embodiment, which can be combined with other embodiments, the STL 320 is a spin polarization layer (SPL) or a spin polarizing layer. The sides of the spintronic device 330 at the MFS are ion milled or patterned, for example, to form the spintronic device shape as shown. The multilayer structure 310 is disposed between and in contact with the main pole 220 and the STL 320. The multilayer structure 310 is between the main pole 220 and the trailing shield 240. The multilayer structure 310 is used in place of a seed layer disposed on the main pole 220. The first spacer layer 390 is between the STL 320 and the trailing shield 240. A TS hot seed layer 380 is over the first spacer layer 390. The TS hot seed layer 380 is magnetically stitched with a notch of the TS 240.

A current source 270 is configured to supply a current to the spintronic device 330. The current supplied using the current source 270 facilitates an electron flow from the main pole 220 through the spintronic device 330 to the TS 240. The direction of the current supplied through the spintronic device 330 is opposite of the direction of the electron flow through the spintronic device 330. Polarized electrons from the STL 320 are reflected off from a first interface 301 between the TS 240 and the first spacer layer 390, such as between the TS hot seed layer 380 and the first spacer layer 390, back toward the STL 320. Spin accumulation and spin torque occurs at a second interface 302 between the first spacer layer 390 and the STL 320.

The STL 320 is initially magnetized in the same direction as magnetization of the main pole 220 and the TS 240, which is in a direction from the main pole 220 to the TS 240 and is in the same direction as the electron flow. The spin torque acts on the STL 320 causing spin flipping of the STL 320 and precession of magnetization M of the STL 320. Precession of the magnetization M of the STL 320 can generate an assisting magnetic field, such as a DC field, emitted to a magnetic recording medium. The assisting magnetic field reduces the coercive force of the recording medium and enhances the write field from the main pole 220 to write to the recording medium.

The bias voltage (Vjump) at which spin flipping occurs is estimated according to formula (1):

$$Vjump = J_c * RA \quad (1)$$

in which $J_c$ is the critical current density for STT switching against the gap field.

The multilayer structure 310 includes a first layer structure 311 on the main pole 220 and a second layer structure 314 on the first layer structure 311. The spintronic device includes at least one negative polarization layer (NPL) 312. The second layer structure 314 is between the first layer structure 311 and the STL 320, and is in contact with the first layer structure 311 and the STL 320. The first layer structure 311 includes the negative polarization layer (NPL) 312. The negative polarization layer 312 is magnetic and includes a magnetic material, and is magnetized in the same direction as the main pole 220 and the electron flow. In one embodiment, which can be combined with other embodiments, the first layer structure 311 is a monolayer including the negative polarization layer 312 where the negative polarization layer 312 is in contact with the main pole 220 and the second layer structure 314, and is magnetically stitched to the main pole 220. In one example, the negative polarization layer 312 is magnetically stitched to the main pole 220. A notch in the main pole 220 can be created during the formation process of the spintronic device 330. In one embodiment, which can be combined with other embodiments, the first layer structure 311 is a bilayer and a ferromagnetic layer 313 is disposed between the main pole 220 and the negative polarization layer 312.

In one embodiment, which can be combined with other embodiments, the negative polarization layer 312 includes a plurality of electron energy bands that includes a majority spin channel and a minority spin channel. For the negative polarization layer 312, the minority spin channel includes a conductivity that is larger than a conductivity of the majority spin channel.

In one embodiment, which can be combined with other embodiments, the ferromagnetic layer 313 includes a plurality of electron energy bands that includes a majority spin channel and a minority spin channel. For the ferromagnetic layer 313, the majority spin channel includes a conductivity that is larger than a conductivity of the minority spin channel.

The NPL 312 includes one or more of Fe, Cr, N, Co, and/or Gd, such as FeCr, or an iron nitride ($Fe_xN_x$). In one embodiment, which can be combined with other embodiments, the NPL 312 includes one or more ferromagnetic materials that have a negative spin accumulation. In one embodiment, which can be combined with other embodiments, the NPL 312 includes an alloy of two materials with lattices that are oppositely aligned, such as Co and Gd in an antiparallel alignment. The first layer structure 311 includes a first thickness T1. The first thickness T1 is within a range of 3 nm to 10 nm. The first thickness T1 may be varied according to a diffusion length of the NPL 312. In one example, the NPL 312 includes a spin diffusion length of about 2 nm. The NPL 312 includes a thickness T3 that is within a range of 3 nm to 6 nm, such as 5 nm. In one example, such as an example where the first layer structure 311 is a monolayer, the first thickness T1 of the first layer structure 311 is equal to the thickness T3 of the NPL 312. The ferromagnetic layer 313, if included, includes a thickness T4 that is up to 6 nm.

The second layer structure 314 includes a material that has a long diffusion length, such as a diffusion length that is longer than the diffusion length of the NPL 312. The second layer structure 314 includes one or more layers each including one or more of Cr or Cu. The second layer structure 314 is a composite structure including at least two differing materials. In one embodiment, which can be combined with other embodiments, the second layer structure 314 is a monolayer including one or more of Cr or Cu. In one embodiment, which can be combined with other embodiments, the second layer structure 314 is a bilayer and includes a first layer 315 disposed on the NPL 312, and a second layer 316 disposed on the first layer 315 and between the first layer 315 and the STL 320. The first layer 315 and the second layer 316 each includes one or more of Cr or Cu. The first layer 315 includes Cr and the second layer 316 includes Cu. The first layer 315 includes a material having a negative interface polarization factor ($\Upsilon$), such as about −0.2. The negative interface polarization factor ($\Upsilon$) is at the interface between the first layer 315 and the NPL 312. The second layer structure 315 includes a second thickness T2 that is within a range of 3 nm to 8 nm. The first layer 315 includes a thickness T5 that is within a range of 0.5 nm to 1.5 nm, such as 1.0 nm. The second layer 316 includes a thickness T6 that is within a range of 1.5 nm to 7.5 nm, such as within a range of 1.5 nm to 2.5 nm, for example 2.0 nm. The second layer structure 314 is a spacer layer structure that is a second spacer layer if the first spacer layer 390 is included. In one example, such as when the second layer structure is a bilayer, the second thickness T2 is equal to the thickness T5 added with the thickness T6.

In one embodiment, which can be combined with other embodiments, the first layer structure 311 is a monolayer including the NPL 312 where the NPL 312 is an FeCr layer having the first thickness T1, the second layer structure 314 is a bilayer including the first layer 315 and the second layer 316, the first layer 315 is a Cr layer having the thickness T5, and the second layer 316 is a Cu layer having the thickness T6.

Figure 3B:
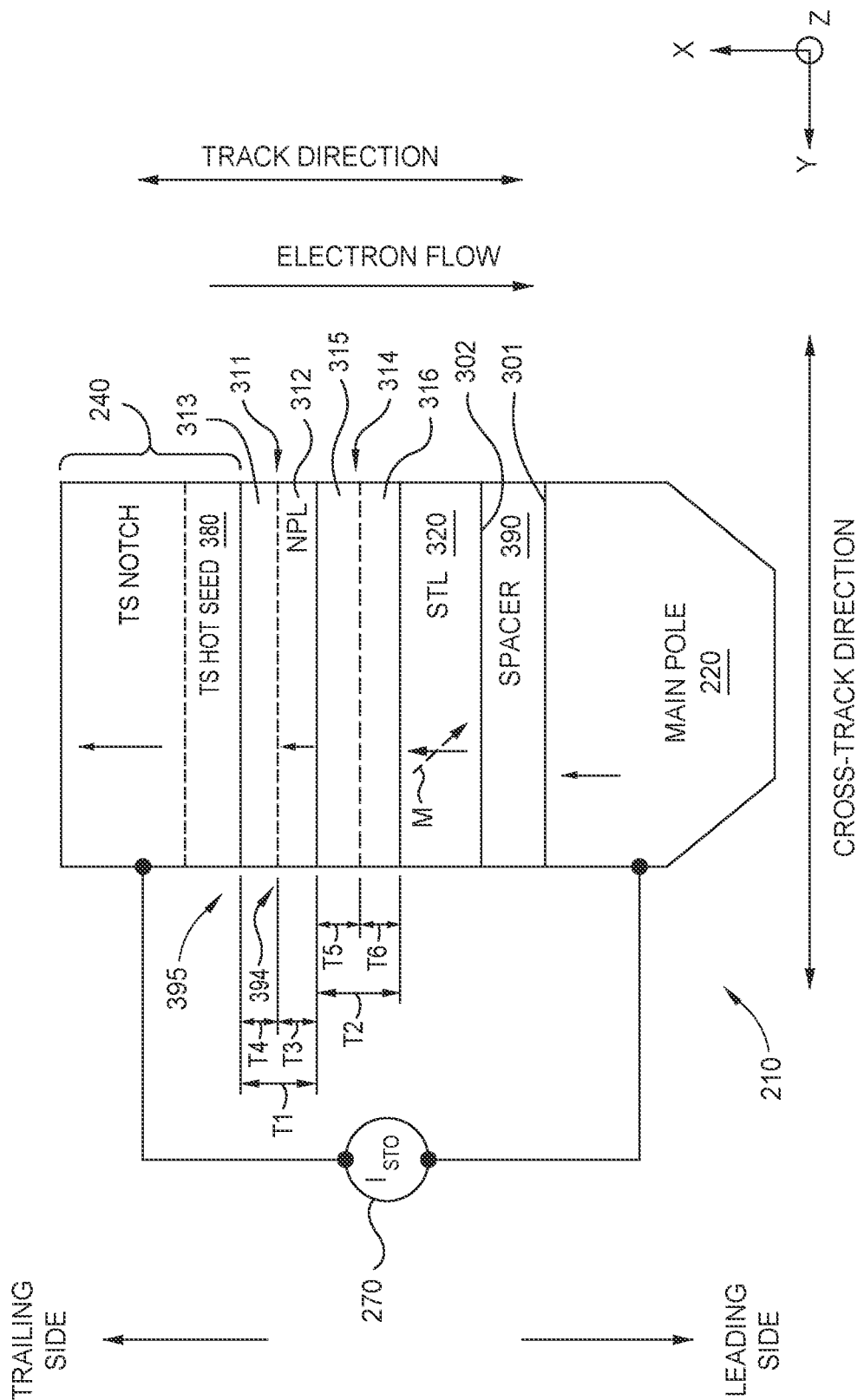
FIG. 3B is a schematic illustration of a plan view of an MFS of the write head shown in FIG. 2, according to one implementation.

FIG. 3B is a schematic illustration of a plan view of an MFS of the write head 210 shown in FIG. 2, according to one implementation. The write head 210 includes a spintronic device 395 between the main pole 220 and the TS 240 in the track direction. The spintronic device 395 may be used as the spintronic device 230 shown in FIG. 2.

The spintronic device 395 is similar to the spintronic device 330 shown in FIG. 3A, and includes one or more of the aspects, features, components, and/or properties thereof. The spintronic device 395 includes a multilayer structure 394 that is similar to the multilayer structure 310 shown in FIG. 3A. In the spintronic device 395, the dispositions of the multilayer structure 394 and the first spacer layer 390 are switched relative to the dispositions of the multilayer structure 310 and the first spacer layer 390 shown in FIG. 3A. In the spintronic device 395 shown in the implementation of FIG. 3B, the first spacer layer 390 is formed between the STL 320 and the main pole 220, and the multilayer structure 394 is formed between the STL 320 and the TS hot seed layer 380. In the multilayer structure 394 of the spintronic device 395, dispositions of the layers 312, 313, 315, 316 are reversed relative to the dispositions of the layers 312, 313, 315, 316 shown in the spintronic device 330 of FIG. 3A. The dispositions of the layers 312, 313, 315, 316 are such that the ferromagnetic layer 313 is disposed at a first end of the multilayer structure 394 and in contact with the TS hot seed layer 380, and such that the second layer 316 is disposed at a second end of the multilayer structure 394 and in contact with the STL 320.

In the implementation shown in FIG. 3B, the directions of the current through the spintronic device 395 and the electron flow through the spintronic device 395 are reversed relative to the directions of the current and the electron flow shown in FIG. 3A. The current flowing through the spintronic device 395 flows from the main pole 220 and to the TS 240. The electron flow flowing through the spintronic device 395 flows from the TS 240 and to the main pole 220. The direction of the current supplied using the current source 270 through the spintronic device 395 is opposite of the direction of the electron flow through the spintronic device 395.

Polarized electrons from the STL 320 are reflected off from a first interface 301 between the main pole 220 and the first spacer layer 390, and back toward the STL 320. Spin accumulation and spin torque occurs at a second interface 302 between the first spacer layer 390 and the STL 320.

The magnetizations of the main pole 220, the NPL 312, the STL 320, and the TS 240 in the spintronic device 395 shown in FIG. 3B are in the same directions as the magnetizations of the main pole 220, the NPL 312, the STL 320, and the TS 240 shown in and described in relation to the spintronic device 330 of FIG. 3A. The present disclosure contemplates that, depending on a polarity of the write current through a write coil (such as the coil 218 shown in FIG. 2), the magnetizations of magnetic layers (such as the main pole 220, the NPL 312, the STL 320, and the TS 240) may be in a direction from the main pole 220 and toward the TS 240 (as shown in FIG. 3A and FIG. 3B) or may be in a direction from the TS 240 and toward the main pole 220.

Figure 4:
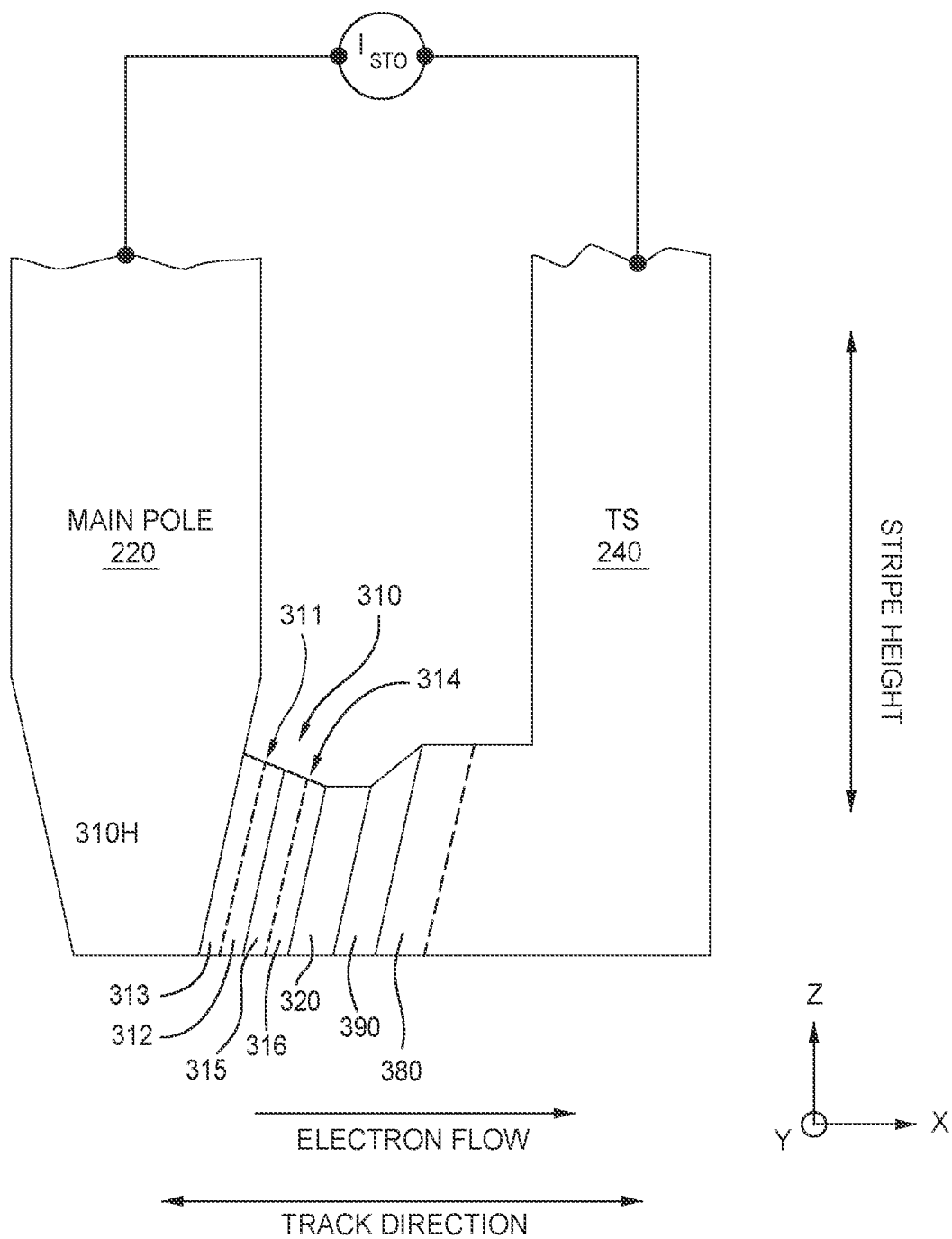
FIG. 4 is a schematic illustration of a cross-sectional throat view of the spintronic device of the write head shown in FIG. 3A, according to one implementation.

FIG. 4 is a schematic illustration of a cross-sectional throat view of the spintronic device 330 of the write head 210 shown in FIG. 3A, according to one implementation. The layers 310, 320, 330, the main pole 220, and the TS 240 can have the same cross-track widths (as shown in FIG. 3A) or may have differing cross-track widths. The layers 310, 320, 330, may have differing stripe heights (as shown in FIG. 4), or may have the same stripe heights. The layers 310, 320, 330, such as the first layer structure 311 and the second layer structure 314, and the first spacer layer 390, may be tapered (as shown in FIG. 4) or non-tapered.

The STL 320 of the spintronic device 330, 395 of FIGS. 3A-B and 4 may include one or more of NiFe, CoFe, CoFeNi, CoMnGe, NiCo, NiFeCu, CoFeMnGe, CoMnSi, CoFeSi, and/or other soft or hard ferromagnetic materials, other Heusler alloys, other suitable magnetic layers, and/or multiple layers thereof. The STL 320 can include a material having magnetic anisotropy oriented in any general direction, such as perpendicular, angled, or longitudinal, to the plane of the MFS. In one embodiment, which can be combined with other embodiments, the STL 320 includes a magnetic anisotropy initially oriented in the same direction as the magnetic orientation of the main pole 220 and the electron flow, as shown in FIG. 3A.

The first spacer layer 390 of the spintronic device 330, 395 shown in FIGS. 3A-B and 4 includes one or more non-magnetic conductive materials, such as Au, Ag, Al, Cu, AgSn, NiAl, and/or other non-magnetic conductive materials, alloys thereof, and/or multiple layers thereof. The first spacer layer 390 may be made of a material having a high spin transmissivity for spin torque transfer on the STL 320.

The second layer structure 314 is a non-magnetic spacer layer including one or more non-magnetic materials. The first and second layers 315, 316 of the second layer structure 314 include one or more non-magnetic conductive materials, such as Au, Ag, Al, Cu, AgSn, NiAl, Cr, and/or other non-magnetic conductive materials, alloys thereof, and/or multiple layers thereof. The first and second layers 315, 316 may be made of a material having a high spin transmissivity for spin torque transfer on the STL 320.

The main pole 220 of the write head 210 shown in FIGS. 3A-B and 4 may be any suitable shape (e.g., trapezoidal, triangular, etc.) having suitable dimensions. The write head 210 of FIGS. 3A-B and 4 may include a leading shield positioned on one or more sides of the main pole 220 with a leading gap therebetween. The write head 210 of FIGS. 3A-B and 4 may include a side gap positioned on the sides of the spintronic device 330, 395. The side gap may include an insulating material.

In FIG. 3A the track direction is labeled as the x-coordinate and the cross-track direction is labeled as the y-coordinate. The perpendicular direction to the MFS would be the z-coordinate into/out of the X-Y plane. In FIG. 4, the track direction is labeled as the x-coordinate and the general stripe height direction is labeled in the z-coordinate.

The multilayer structure 310 facilitates operation of the STL 320. As an example, negative spin accumulation of the NPL 312 facilitates generating direct torque on the STL 320 to facilitate spin flipping of the STL 320 against the field direction, and to facilitate precession of the magnetization of the STL 320. The NPL 312 facilitates applying torque to the STL 320 from both sides of the STL 320, such as both in a direction from the TS 240 and to the STL 320, and in a direction from the main pole 220 and to the STL 320. As an example, the negative interface polarization factor ($\gamma$) of the second layer structure 314 enhances the negative spin polarization of the NPL 312. Such aspects facilitate lower voltage or lower current for the spintronic device 330, 395 to facilitate reliability and effective performance of the write head 210 while facilitating high moment-thickness product and high ADC of magnetic recording for the write head 210. Such aspects also facilitate modularity for various configurations of the write head 210 and the materials that may be used for various components of the write head 210, which may further lower current density and/or voltage of the write head 210.

Aspects of the multilayer structure 310 facilitate a reduction in critical current for flipping or switching of the STL 320 that is up to 30% relative to a seed layer on the main pole 220, such as a reduction in critical current density $J_c$ of up to 15%-20%, due to the increase in spin-transfer torque of the STL 320.

Figure 5:
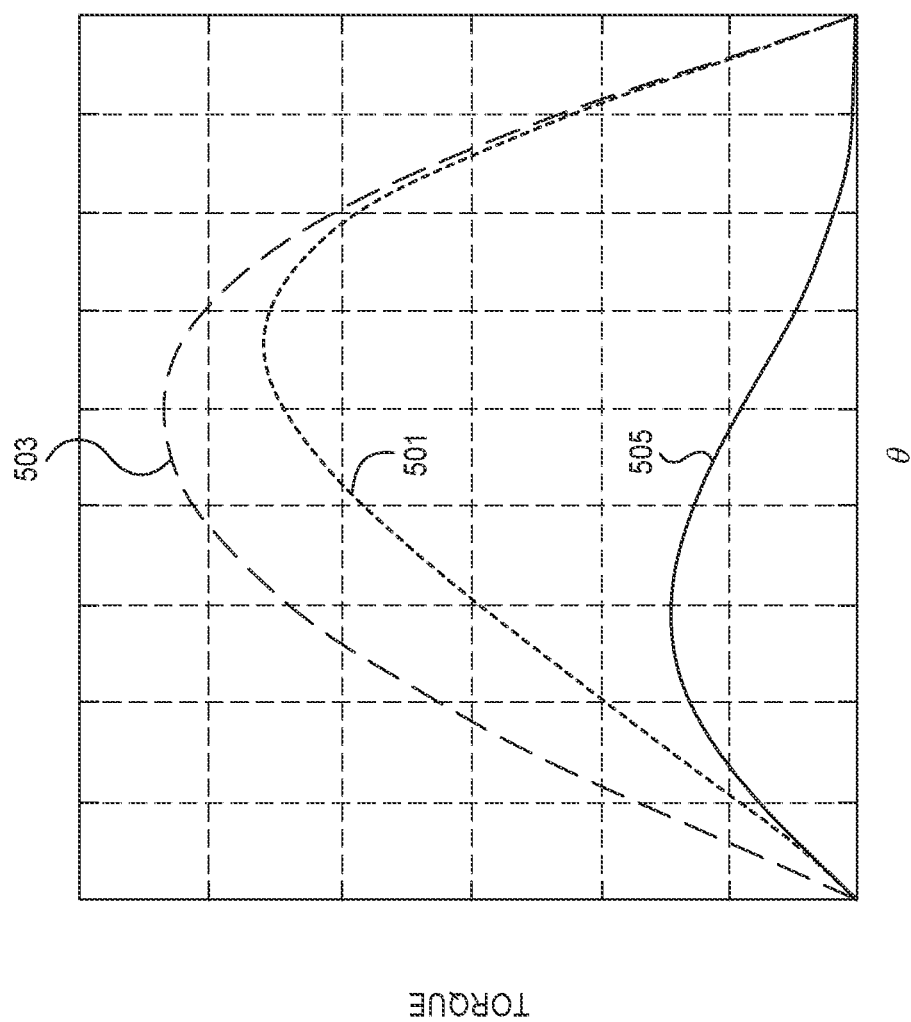
FIG. 5 is a schematic graphical illustration of calculated torque of an STL versus an angle of magnetization for the STL, according to one implementation.

FIG. 5 is a schematic graphical illustration of calculated torque of an STL versus an angle of magnetization for the STL, according to one implementation. The torque of the STL (normalized to critical current density $J_c$) is mapped on the vertical axis and the angle of magnetization $\theta$ is mapped on the horizontal axis. The torque versus the angle of magnetization $\theta$ is calculated using a Valet-Fert Transport Model. A first case 501 represents a seed layer on a main pole, and a second case 503 represents use of the NPL described herein. An increase profile 505 represents the increase of torque using the second case 503 relative to the first case 501. As shown in FIG. 5, use of the NPL in the second case 503 results in an increase of torque of the STL that is up to 20% over the seed layer used in the first case 501, across angles of magnetization θ.

Figure 6:
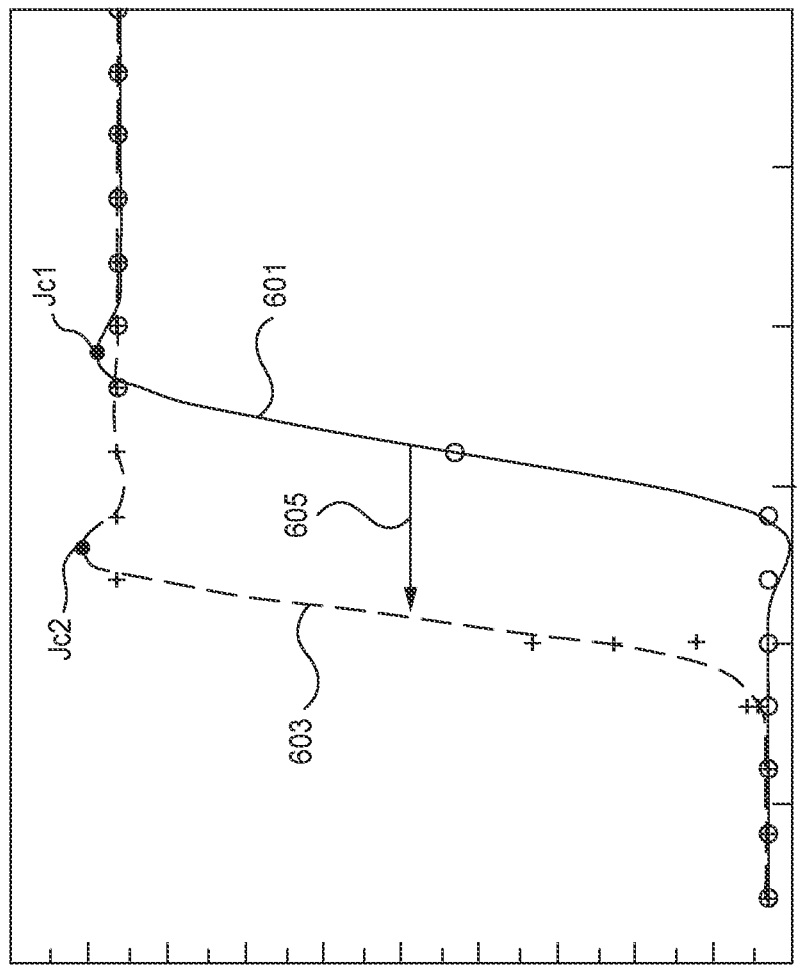
FIG. 6 is a schematic graphical illustration of an angle of magnetization for the STL versus applied current density, according to one implementation.

FIG. 6 is a schematic graphical illustration of an angle of magnetization for the STL versus applied current density, according to one implementation. The angle of magnetization θ for the STL is mapped on the vertical axis and the applied current density J is mapped on the horizontal axis. The angle of magnetization θ versus the applied current density J is calculated using a Valet-Fert Transport Model. Critical current density $J_c$ is for STL switching and corresponds to the point where the applied current density J is sufficient to rotate the magnetization of the STL from an initial orientation to switch or flip the magnetization of the STL to an opposite direction that is opposite of the initial orientation. A first case 601 represents a seed layer on a main pole, and a second case 603 represents use of the NPL described herein. As shown in FIG. 6, use of the NPL in the second case 603 results in a reduction 605 in applied current density J that is up to 30%-45% less than the applied current density of the first case 601, across angles of magnetization θ. Also shown in FIG. 6, a critical current density Jc2 of the second case 603 is up to 30%-45% less than a critical current density Jc1 of the first case 601.

Benefits of the present disclosure include simple and effective facilitated magnetic recording performance and reliability; increased ADC for magnetic recording; reduced voltage or current while maintaining or facilitating increased moment-thickness product, magnetic recording head performance and reliability; modularity in magnetic recording head materials; and modularity in magnetic recording device design configurations.

It is contemplated that one or more aspects disclosed herein may be combined. Moreover, it is contemplated that one or more aspects disclosed herein may include some or all of the aforementioned benefits.

In one embodiment, a magnetic recording head comprises a main pole, a trailing shield, a spin torque layer (STL) between the main pole and the trailing shield, and a first spacer layer between the STL and the trailing shield. The magnetic recording head also includes a multilayer structure disposed on the main pole and between the main pole and the STL. The multilayer structure includes a first layer structure on the main pole. The first layer structure includes a negative polarization layer. The multilayer structure also includes a second layer structure disposed on the negative polarization layer and between the negative polarization layer and the STL. The negative polarization layer is in contact with the main pole and the second layer structure is in contact with the STL. The negative polarization layer includes one or more of Fe, Cr, N, Co, or Gd. The negative polarization layer includes a ferromagnetic material, and the second layer structure includes a non-magnetic material. The negative polarization layer is an FeCr layer. The second layer structure includes a Cr layer on the negative polarization layer, and a Cu layer disposed on the Cr layer and between the Cr layer and the STL. The first layer structure also includes a ferromagnetic layer on the main pole and between the main pole and the negative polarization layer. The first layer structure includes a first thickness that is within a range of 3 nm to 10 nm. The second layer structure includes a second thickness that is within a range of 3 nm to 8 nm. The second layer structure includes a first layer disposed on the negative polarization layer of the first layer structure. The first layer of the second layer structure includes a material having a negative interface polarization factor. The second layer structure also includes a second layer disposed on the first layer and between the first layer and the STL. Each of the first layer and the second layer of the second layer structure includes one or more of Cr or Cu. The negative polarization layer is magnetically stitched to the main pole. A magnetic recording device including the magnetic recording head is also disclosed.

In one embodiment, a magnetic recording head comprises a main pole, a trailing shield, a spin torque layer (STL) between the main pole and the trailing shield, and a multilayer structure disposed on the main pole and between the main pole and the STL. The multilayer structure includes an FeCr layer between the main pole and the STL, a Cr layer disposed on the FeCr layer, and a Cu layer disposed on the Cr layer and between the Cr layer and the STL. The FeCr layer includes a thickness that is within a range of 3 nm to 6 nm. The Cr layer includes a thickness that is within a range of 0.5 nm to 1.5 nm, and the Cu layer includes a thickness that is within a range 1.5 nm to 7.5 nm. The thickness of the Cu layer is within a range of 1.5 nm to 2.5 nm. A magnetic recording device including the magnetic recording head is also disclosed.

In one embodiment, a magnetic recording head comprises a main pole, a trailing shield, a spin torque layer (STL) between the main pole and the trailing shield, and at least one negative polarization layer between the main pole and the STL. A magnetic recording device including the magnetic recording head is also disclosed. The at least one negative polarization layer includes a magnetic material.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
   a main pole;
   a trailing shield;
   a spin torque layer (STL) disposed between the main pole and the trailing shield; and
   a multilayer structure disposed between the STL and the trailing shield, the multilayer structure comprising:
      a first layer structure disposed on the STL, wherein the first layer structure comprises:
         a first layer disposed on the STL; and
         a second layer disposed on the first layer; and
      a second layer structure disposed on the first layer structure, where the second layer structure comprises a negative polarization layer contacting the trailing shield.

2. The magnetic recording head of claim 1, further comprising a spacer layer disposed between the main pole and the STL.

3. The magnetic recording head of claim 1, wherein the second layer structure comprises a ferromagnetic layer.

4. The magnetic recording head of claim 3, wherein the ferromagnetic layer is disposed on a Cu layer.

5. The magnetic recording head of claim 1, wherein the negative polarization layer comprises one or more of Fe, Cr, N, Co, or Gd.

6. The magnetic recording head of claim 1, wherein the first layer structure has a first thickness of between about 3 nm and about 8 nm.

7. The magnetic recording head of claim 1, wherein the second layer structure has a second thickness of between about 3 nm and about 10 nm.

8. The magnetic recording head of claim 1, wherein the negative polarization layer comprises FeCr.

9. The magnetic recording head of claim 1, wherein the first layer structure comprises a Cr layer; and a Cu layer disposed on the Cr layer.

10. The magnetic recording head of claim 1, wherein the second layer comprises a material having a negative interface polarization factor.

11. The magnetic recording head of claim 10, wherein each of the first layer and the second layer comprise one or more of Cr or Cu.

12. A magnetic recording device comprising the magnetic recording head of claim 1.

13. A magnetic recording head, comprising:
a main pole;
a trailing shield;
a spin torque layer (STL) disposed between the main pole and the trailing shield; and
a multilayer structure disposed on the STL between the STL and the trailing shield, wherein the multilayer structure comprises:
an FeCr layer disposed between the STL and the trailing shield, the FeCr layer contacting the trailing shield;
a Cr layer disposed on the FeCr layer; and
a Cu layer disposed on the Cr layer and between the Cr layer and the STL.

14. The magnetic recording head of claim 13, wherein the FeCr layer has a thickness of between about 3 nm and about 6 nm.

15. The magnetic recording head of claim 13, wherein the Cr layer has a thickness of between about 0.5 nm and about 1.5 nm, and the Cu layer has a thickness of between about 1.5 nm and about 7.5 nm.

16. The magnetic recording head of claim 15, wherein the Cu layer has a thickness of between about 1.5 nm and about 2.5 nm.

17. A magnetic recording device comprising the magnetic recording head of claim 13.

18. A magnetic recording head, comprising:
a main pole;
a trailing shield;
a spin torque layer (STL) disposed between the main pole and the trailing shield;
at least one negative polarization layer disposed between the STL and the trailing shield, the at least one negative polarization layer contacting the trailing shield and comprising a magnetic material;
a first layer disposed between the negative polarization layer and the STL, the first layer comprising a material having a negative interface polarization factor; and
a second layer disposed between the first layer and the STL.

19. The magnetic recording head of claim 18, wherein at least two of the following layers comprise Cr: the at least one negative polarization layer, the first layer, and the second layer.

20. A magnetic recording device comprising the magnetic recording head of claim 18.

* * * * *